(12) United States Patent
Sata et al.

(10) Patent No.: US 9,523,428 B2
(45) Date of Patent: Dec. 20, 2016

(54) SYSTEM AND METHOD FOR SHIFT RESTRAINT CONTROL

(71) Applicant: Toyota Motor Engineering & Manufacturing North America, Inc., Erlanger, KY (US)

(72) Inventors: Andrew G. Sata, Northridge, CA (US); Masato Shimizu, Toyota Aichi (JP)

(73) Assignees: Toyota Motor Engineering & Manufacturing North America, Inc., Erlanger, KY (US); Toyota Jidosha Kabushiki Kaisha, Aichi-Ken (JP)

( * ) Notice: Subject to any disclaimer, the term of this patent is extended or adjusted under 35 U.S.C. 154(b) by 38 days.

(21) Appl. No.: 14/179,493

(22) Filed: Feb. 12, 2014

(65) Prior Publication Data

US 2015/0224977 A1    Aug. 13, 2015

(51) Int. Cl.
| | |
|---|---|
| *F16H 61/662* | (2006.01) |
| *F16H 61/04* | (2006.01) |
| *F16H 59/36* | (2006.01) |
| *F16H 59/18* | (2006.01) |
| *B60W 10/06* | (2006.01) |
| *B60W 10/10* | (2012.01) |

(52) U.S. Cl.
CPC ........ *F16H 61/66259* (2013.01); *F16H 61/04* (2013.01); *B60W 10/06* (2013.01); *B60W 10/10* (2013.01); *B60W 2710/0605* (2013.01); *B60W 2710/1011* (2013.01); *F16H 59/18* (2013.01); *F16H 2059/363* (2013.01); *Y02T 10/76* (2013.01)

(58) Field of Classification Search
None
See application file for complete search history.

(56) References Cited

U.S. PATENT DOCUMENTS

| | | | |
|---|---|---|---|
| 5,161,433 | A | 11/1992 | Sakakibara et al. |
| 5,189,621 | A | 2/1993 | Onari et al. |
| 5,612,873 | A | 3/1997 | Ogawa et al. |

(Continued)

FOREIGN PATENT DOCUMENTS

| | | |
|---|---|---|
| JP | 63251357 | 10/1988 |
| JP | 06081859 | 3/1994 |

(Continued)

*Primary Examiner* — Ramya Burgess
*Assistant Examiner* — Timothy M Hannon
(74) *Attorney, Agent, or Firm* — Snell & Wilmer LLP

(57) ABSTRACT

A system/method for shift restraint control and controlling a transmission input speed or an engine output speed. An automobile may include an acceleration input, a throttle unit, an engine, a torque converter, a transmission, and an electronic control unit (ECU), and a plurality of sensors. The ECU may reduce inertia loss, engine noise, and non-linear acceleration feeling by controlling the engine speed or transmission input speed in an initial shift mode, an inertia hold mode, a return mode, and/or a second shift mode. Drive force is maintained with throttle compensation, and fuel economy is maintained or improved due to the reduction in inertia loss. The ECU may limit an initial downshift using a maximum guard value and subsequently control a rate of increase of the transmission input speed or engine output speed using increments until a target is reached or a cancel condition is met.

16 Claims, 11 Drawing Sheets

(56) References Cited

U.S. PATENT DOCUMENTS

| | | | |
|---|---|---|---|
| 5,772,554 A * | 6/1998 | Tabata | F16H 59/0204 |
| | | | 477/109 |
| 5,882,276 A | 3/1999 | Usuki et al. | |
| 6,098,001 A | 8/2000 | Yuasa | |
| 6,174,261 B1 | 1/2001 | Watanabe et al. | |
| 6,849,030 B2 | 2/2005 | Yamamoto et al. | |
| 7,059,298 B2 | 6/2006 | Ozaki et al. | |
| 7,367,313 B2 | 5/2008 | Chang et al. | |
| 7,441,547 B2 | 10/2008 | Kawamura et al. | |
| 7,563,196 B2 | 7/2009 | Yamada et al. | |
| 8,335,633 B2 | 12/2012 | Araki et al. | |
| 8,423,213 B2 | 4/2013 | Tsuda et al. | |
| 2002/0035013 A1* | 3/2002 | Saito | F16H 61/0437 |
| | | | 477/120 |
| 2002/0107106 A1* | 8/2002 | Kato | B60K 31/0008 |
| | | | 477/110 |
| 2003/0171187 A1* | 9/2003 | Aoki | B60K 6/485 |
| | | | 477/107 |
| 2005/0239597 A1* | 10/2005 | Shimada | B60W 10/06 |
| | | | 477/107 |
| 2006/0166784 A1* | 7/2006 | Tabata | B60K 6/445 |
| | | | 477/37 |
| 2007/0106448 A1* | 5/2007 | Minowa et al. | 701/96 |
| 2008/0153667 A1* | 6/2008 | Ishii et al. | 477/115 |
| 2009/0157269 A1* | 6/2009 | Matsubara | B60K 6/365 |
| | | | 701/54 |
| 2009/0319137 A1* | 12/2009 | Miyanoo | 701/54 |
| 2010/0175663 A1* | 7/2010 | Ito | F02D 37/02 |
| | | | 123/406.12 |
| 2011/0246009 A1 | 10/2011 | Hase et al. | |
| 2012/0179342 A1* | 7/2012 | Noumura | B60W 10/06 |
| | | | 701/54 |
| 2013/0080004 A1 | 3/2013 | Hattori et al. | |
| 2013/0196816 A1* | 8/2013 | Natsume | B60K 6/48 |
| | | | 477/3 |

FOREIGN PATENT DOCUMENTS

| | | |
|---|---|---|
| JP | 2004-162800 | 6/2004 |
| JP | 2009-101910 | 5/2009 |
| JP | 2010077998 | 4/2010 |

* cited by examiner

| Y \ X | 0 | 400 | 1000 | 1450 | 1950 | 2450 | 3000 | 4000 | 5000 | 6000 | 7000 |
|---|---|---|---|---|---|---|---|---|---|---|---|
| 0 | 2500 | 2500 | 2500 | 2500 | 2500 | 2500 | 2500 | 2500 | 2500 | 2500 | 2500 |
| 5 | 2500 | 2500 | 2500 | 2500 | 2500 | 2500 | 2500 | 2500 | 2500 | 2500 | 2500 |
| 10 | 2500 | 2500 | 2500 | 2500 | 2500 | 2500 | 2500 | 2500 | 2500 | 2500 | 2500 |
| 15 | 2500 | 2500 | 2500 | 2500 | 2500 | 2500 | 2500 | 2500 | 2500 | 2500 | 2500 |
| 20 | 2500 | 2500 | 2500 | 2500 | 2500 | 2500 | 2500 | 2500 | 2500 | 2500 | 2500 |
| 60 | 2500 | 2500 | 2500 | 2500 | 2500 | 2500 | 2500 | 2500 | 2500 | 2500 | 2500 |

FIG. 11

| Y \ X | 0 | 10 | 20 | 30 | 40 |
|---|---|---|---|---|---|
| 0 | 100 | 400 | 600 | 800 | 1000 |
| 1000 | 100 | 300 | 500 | 700 | 900 |
| 2000 | 100 | 200 | 400 | 600 | 800 |
| 3000 | 100 | 100 | 300 | 500 | 700 |
| 4000 | 100 | 100 | 200 | 400 | 600 |
| 5000 | 100 | 100 | 100 | 200 | 500 |

FIG. 13

| Y \ X | 0 | 10 | 20 | 30 | 40 |
|---|---|---|---|---|---|
| 0 | 1300 | 800 | 500 | 300 | 200 |
| 1000 | 1300 | 800 | 500 | 300 | 200 |
| 2000 | 1300 | 800 | 500 | 300 | 200 |
| 3000 | 1300 | 800 | 500 | 300 | 200 |
| 4000 | 1300 | 800 | 500 | 300 | 200 |
| 5000 | 1300 | 800 | 500 | 300 | 200 |

FIG. 14

| Y \ X | 0 | 10 | 20 | 30 | 40 | 50 | 60 | 70 | 100 |
|---|---|---|---|---|---|---|---|---|---|
| 0 | 0.7656 | 6.25 | 3.9063 | 2.3438 | 1.5625 | 1.5625 | 1.5625 | 1.5625 | 1.5625 |
| 1000 | 0.7656 | 6.25 | 3.9063 | 2.3438 | 1.5625 | 1.5625 | 1.5625 | 1.5625 | 1.5625 |
| 2000 | 0.7656 | 6.25 | 3.9063 | 2.3438 | 1.5625 | 1.5625 | 1.5625 | 1.5625 | 1.5625 |
| 3000 | 0.7656 | 6.25 | 3.9063 | 2.3438 | 1.5625 | 1.5625 | 1.5625 | 1.5625 | 1.5625 |
| 4000 | 0.7656 | 6.25 | 3.9063 | 2.3438 | 1.5625 | 1.5625 | 1.5625 | 1.5625 | 1.5625 |
| 5000 | 0.7656 | 6.25 | 3.9063 | 2.3438 | 1.5625 | 1.5625 | 1.5625 | 1.5625 | 1.5625 |
| 5000 | 0.7656 | 6.25 | 3.9063 | 2.3438 | 1.5625 | 1.5625 | 1.5625 | 1.5625 | 1.5625 |
| 5000 | 0.7656 | 6.25 | 3.9063 | 2.3438 | 1.5625 | 1.5625 | 1.5625 | 1.5625 | 1.5625 |

FIG. 16

SYSTEM AND METHOD FOR SHIFT RESTRAINT CONTROL

BACKGROUND

1. Field

The present invention relates to a system and a method for controlling transmission input speed, engine output speed, and/or transmission ratio based on an acceleration input.

2. Description of the Related Art

Automobiles may include an engine connected to a continuously variable transmission, and a control unit (for example, an electronic control unit (ECU)) that controls the transmission input speed, the engine output speed, and/or the transmission ratio based on a detected acceleration pedal depression amount. In response to depression of the acceleration pedal by the driver, the conventional control methods and systems abruptly and non-linearly shift the transmission and change the transmission input speed or the engine output speed. Such an abrupt and inadequately restrained response leads to engine noise, unfavorable non-linear acceleration feeling for the driver, and considerable inertia waste. Inertia may be defined as the rate of change of the transmission input speed or the engine output speed. The inertia waste resulting from the abrupt and unrestrained changes in the transmission input speed or the engine output speed reduces fuel efficiency as well.

Thus, there is a need for a shift restraint control system/method that reduces inertia waste, and the non-linear/flare feeling for the driver, yet maintains or improves fuel economy before, during and/or after shifting of the transmission.

SUMMARY

The present invention relates to a method and an apparatus for controlling the transmission input speed, the engine output speed, and/or the transmission ratio. An automobile can include, for example, an acceleration input, a throttle unit, an engine, a torque converter, a transmission, an electronic control unit (ECU), and a plurality of sensors. The ECU may reduce the engine noise and the non-linear acceleration feeling by controlling the change rate in the engine speed or the transmission input speed in an initial shift mode, an inertia hold mode, and/or a return mode. The drive force is maintained with or using throttle compensation. The fuel saved by avoiding inertia waste compensates for the fuel consumed by the additional throttle compensation, thereby maintaining or improving the overall fuel efficiency.

In one embodiment, the system and/or method may be activated when certain preconditions are met or satisfied. For example, the system and/or method may be activated by certain operator pedal applications and vehicle conditions to improve control adaptability. For example, the system and/or method may be activated when the torque converter is in a locked state. The control logic of the system and/or method may control the transmission input speed, the engine output speed, and/or the transmission ratio based on an acceleration input until logic completion conditions are met or satisfied.

In one embodiment, the system and/or method sets a target input shaft speed or engine output speed and controls the dynamic character (e.g., the rate of speed change) to reach that target, first with a relatively quick ratio change/shift and then by a defined rate of increase or decrease. The static target for the input shaft speed or engine output speed is based on the acceleration input.

In one embodiment, the present invention relates to a shift restraint control system of an automobile. The shift restraint control (SRC) system may include an acceleration input sensor for detecting an acceleration input. The SRC system may also include an engine having an engine output speed, a torque converter connected to the engine, a transmission connected to the torque converter and having a transmission input speed, and a control unit connected to at least the acceleration input sensor, the engine, and the transmission. The control unit may be configured to restrict an initial shift of the transmission when or after the acceleration input sensor detects a change of the acceleration input, and control a rate of change of the transmission input speed or of the engine output speed after the initial shift for reducing an inertia waste.

In another embodiment, the present invention relates to a shift restraint control (SRC) system of an automobile, the SRC system including a sensor connected to the acceleration input device for detecting the acceleration input. The SRC system may further include an engine having an engine output speed, a torque converter connected to the engine, a transmission connected to the torque converter and having a transmission input speed, and a control unit connected to the sensor, the engine, and the transmission. The control unit may be configured to determine whether a plurality of preconditions for the automobile are met or satisfied. The control unit may restrict an initial downshift of the transmission in an initial downshift mode when or after the first sensor detects an increase of the acceleration input and the plurality of preconditions for the automobile are met or satisfied. The control unit may control a rate of increase of the transmission input speed or of the engine output speed after the initial downshift for reducing an inertia waste during an inertia hold mode, and control a rate of decrease of the transmission input speed or of the engine output speed during a return mode.

In yet another embodiment, the present invention may relate to a method for transmission shift restraint control of an automobile. The method may include the step of providing a torque converter connecting an engine to a transmission, the engine having an engine output speed and the transmission having a transmission input speed. The method may further include the step of detecting, using an acceleration input sensor, an acceleration input. Using a control unit, an initial shift of the transmission is restricted when or after the acceleration input sensor detects a change of the acceleration input. The method may further include the step of controlling, using the control unit, a rate of change of a transmission input speed of the transmission or of the engine output speed after the initial shift for reducing an inertia waste.

BRIEF DESCRIPTION OF THE DRAWINGS

The features, obstacles, and advantages of the present invention will become more apparent from the detailed description set forth below when taken in conjunction with the drawings, wherein:

FIG. 11 shows a look-up table stored in the memory and corresponding to maximum guard values for the initial shift of the shift restraint control system and/or method according to an embodiment of the present invention;

FIG. 13 shows a look-up table stored in the memory and corresponding to a rate of increase of the input shaft speed or engine output speed under the shift restraint control system and/or method according to an embodiment of the present invention;

FIG. 14 shows a look-up table stored in the memory and corresponding to a rate of decrease of the input shaft speed or engine output speed under the shift restraint control system and/or method according to an embodiment of the present invention;

FIG. 16 shows a look-up map table that refers to engine speed reduction rates during the return phase for a given value of acceleration input and a given value of vehicle speed or output speed of the transmission according to an embodiment of the present invention.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
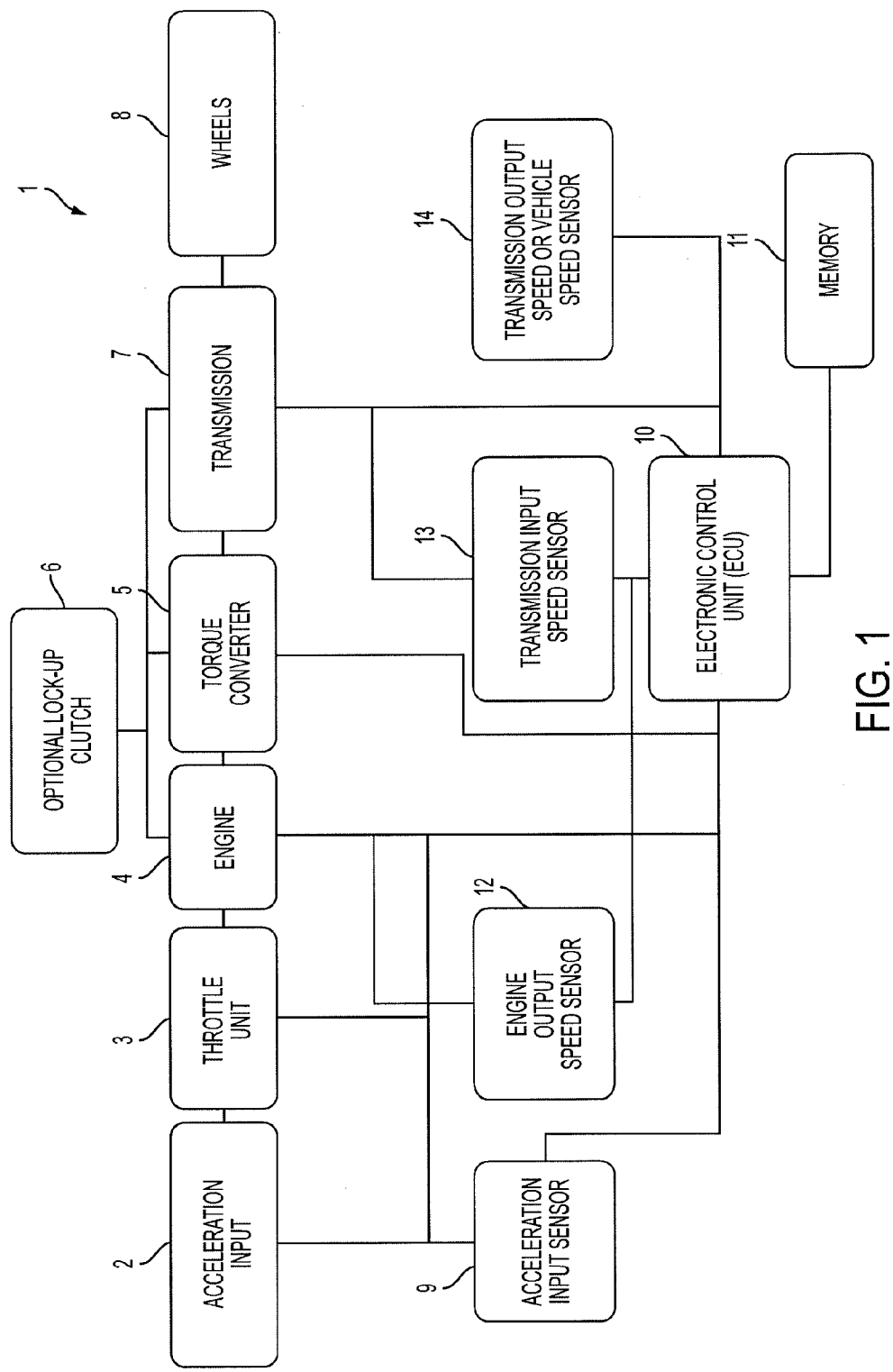
FIG. 1 shows a block diagram of structural automobile components of a shift restraint control system and/or method according to an embodiment of the present invention.

FIG. 1 shows a block diagram of structural components of a shift restraint control system 1 for an automobile according to an embodiment of the present invention. The shift restraint control (SRC) system 1 may include an acceleration input 2 that may be, for example, an acceleration pedal. An acceleration input sensor 9 detects an acceleration input amount of the acceleration input 2, which corresponds to, for example, a depression percentage of the acceleration pedal. Although throughout the application, references are made to acceleration input or pedal acceleration, the method and/or system of present invention is not limited to such inputs. The method and system restricts a shifting operation based on detecting parameters corresponding to driver's intention or request as to an acceleration, deceleration, power output, speed, or combinations thereof. For example, the method and/or system may further analyze other types of acceleration input not limited to acceleration pedals and/or analyze braking for detecting deceleration, without limiting the scope of the present invention.

The SRC system 1 includes an engine control unit ("ECU") 10 and/or a memory 11. The ECU 10 may be connected to the acceleration input sensor 9 for responding to the acceleration request by the driver. The ECU 10 may include one or more processors for controlling various operations of the automobile based on data stored in the memory 11 and data detected by various sensors. The data stored in the memory 11 may include data corresponding to look-up tables as discussed below with respect to FIGS. 11, 13, and 14.

The automobile 1 may further include a throttle unit 3. The throttle unit 3 can be connected, for example, to the engine 4. The throttle unit 3 can optionally include, for example, a virtual throttle, and/or a throttle valve. The throttle unit 3 controls airflow to the engine 4 for the combustion of fuel in the engine 4.

In one embodiment, the ECU 10 may determine an amount of throttle compensation by setting a target throttle or air mass flow target based on various detected conditions. In one embodiment, the ECU 10 uses a parallel system and/or method that calculates and operates the required throttle position to achieve a drive force target based on various detected data, which may include data detected by the acceleration input sensor 9 and the detected vehicle speed.

The engine 4 (e.g., an internal combustion engine) may utilize airflow supplied by the throttle unit 3. An engine output speed (NE) sensor 12 may be provided for detecting an output rotational speed of the engine 4. The ECU 10 may determine an amount of throttle compensation. For example, the ECU 10 can control a position of the throttle valve in the throttle unit 3 and/or an amount of airflow provided by the throttle unit 3 to the engine 4.

The transmission 7 may be a continuously variable transmission (CVT). The transmission 7 may be connected to a transmission input speed sensor 13 that detects the transmission input speed. The transmission 7 may drive the wheels 8. A torque converter 5 may connect the engine 4 to the transmission 7. When engaged with the torque converter 5, the engine 4 can be used to drive an impeller in the torque converter 5 and drive fluid in the torque converter 5. The engine output torque overcomes the hydrodynamic resistance of the fluid in the torque converter 5. The torque converter 5 may operate in locked or unlocked states.

References in this application to an input shaft speed corresponds to a speed of an input shaft of the transmission 7 (as detected, for example, by the transmission input speed sensor 13) or a connection between the engine 4 and the transmission 7. Alternatively, the input shaft speed may refer to the engine output speed when the torque converter 5 is locked. The transmission input speed may, for example, correspond to the rotation of the turbine in the torque converter 5.

Generally, as the transmission input speed approaches the engine output speed, the hydrodynamic resistance of the fluid in the torque converter is reduced. Optionally, a lock-up clutch 6 may be provided that may, for example, physically link the impeller and turbine of the torque converter 5 for effectively changing the torque converter 5 into a purely mechanical coupling, for eliminating or minimizing slippage and power loss. Other forms of torque converters can be used with or without a lock-up clutch without limiting the scope of the present invention.

The SRC system and/or method 1 may be adjusted and calibrated such that the engine output speed is controlled when the torque convertor 5 is not locked. A transmission output speed and/or vehicle speed sensor 14 may be provided to detect or determine the transmission output speed and/or the vehicle speed.

The ECU 10 may operate different logics depending on whether the torque converter 5 is in a locked position. One objective of the present invention to control engine output speed (NE) by shifting the transmission ratio when the torque converter 5 is locked. When the torque converter 5 is not locked, the ECU 10 can reach desirable effects described herein with calibration.

Figure 2:
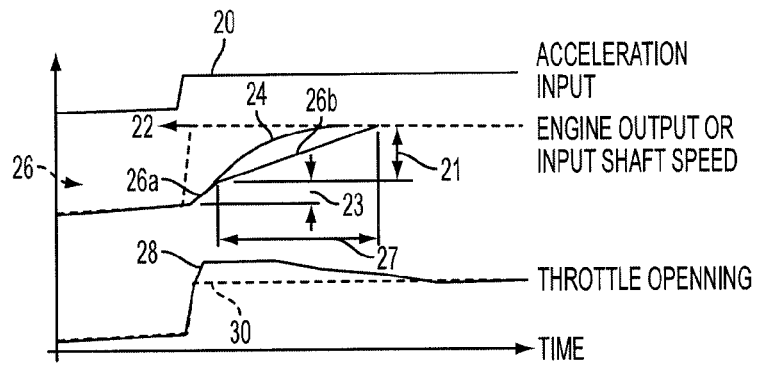
FIG. 2 shows a system and/or method of shift restraint control and controlling the engine output speed and/or transmission input speed based on the acceleration input according to an embodiment of the present invention.

FIG. 2 shows a system and method of shift restraint control and controlling the engine output speed and/or the transmission input speed based on the acceleration input according to an embodiment of the present invention. FIG. 2 shows the pedal acceleration input 20 over time on the X axis. The engine output speed or input shaft speed is plotted on the Y axis.

The SRC system and method may be activated when certain preconditions of the automobile 1 are met or satisfied, detect an acceleration condition, and define the dynamic transmission speed target until logic completion conditions are met or satisfied.

In a control logic, without shift restraint control of the present invention, the "original" input shaft speed 24 may abruptly and non-linearly increase as shown in FIG. 2, causing the engine speed to rise abruptly and leading to an engine flare feeling (as a result of an abrupt change of engine output speed during and/or after shifting). The term "original" as used herein refers to an operation under a control system and/or method different from the control system and/or method of the present invention that does not provide the advantages of the SRC system and method described herein at least with respect to shift restraint control (e.g., the controlling of the initial downshift and the inertia thereafter). Because the SRC system and/or method has multiple steps of controlling the input shaft speed 26, the term "initial" is used to distinguish the starting downshift before reaching the target speed from the subsequent steps (such as inertia hold described below). Input shaft speed 26 refers to, collectively, the initial downshift 26a and the inertia controlled input shaft speed 26b. The term "controlled" as used herein refers to an operation/implementation under the SRC system and/or method. The ECU 10 operates the SRC logic described for performing an initial shift, inertia control, and other operations described herein.

In an embodiment, the ECU 10 may set, for example, a maximum guard value 23 for an initial downshift to control a maximum amount of increase of the controlled input shaft speed 26 during the initial downshift 26a. In one embodiment, the ECU 10 may set a maximum input shaft speed target amount that the input shaft speed 26 can reach during the initial downshift 26a. One purpose of setting the maximum guard value 23 is to control the initial downshift 26a amount for reducing the engine flare. The maximum guard value 23 also increases efficiency to avoid an abrupt and inefficient rise. The maximum guard value 23 for the initial downshift 26a can be determined based on the acceleration input value 20, the vehicle speed, and/or the input shaft speed. As such, to balance fuel economy and drivability, the maximum guard value 23 may be calibrated to provide a larger or smaller downshift.

In one embodiment, the SRC system and method operates as a stand-alone control and defines the shift speed character during the initial downshift 26a. In one embodiment, the characteristics of the initial downshift 26a are the same as or similar to a base/previous control logic that is operating before the SRC system and/or method is operated. In one embodiment, during the initial downshift 26a, the SRC logic may set the transmission input speed or the engine speed but not the shift speed at which the transmission changes ratio because the previous/base control logic determines the shift speed. The previous/base logic may set the rate of increase of the input shaft speed to achieve the maximum guard value 23, and the SRC system and/or method sets the engine or the input shaft speed at the end of the initial downshift 26a. The previous/base logic may continue to operate simultaneously as the SRC system and/or method described herein or may stop operating when the SRC system and/or method is active.

In one embodiment, the system and/or method sets a target input shaft speed or engine output speed and controls the dynamic character (e.g., the rate of speed change) to reach that target, first with a relatively quick ratio change/shift and then by a defined rate of increase or decrease.

As shown in FIG. 2, due to the quick downshift in original control methods/systems, the original engine or input shaft speed 24, within the bounds 21 and 27, non-linearly increases up to the input shaft speed target 22 without inertia control. The inertia as used herein may refer to a rate of change of the engine output speed or input shaft speed over time. The controlled engine output speed or input shaft speed 26 within the bounds 21 and 27 over time shows the controlled rise in the inertia controlled input shaft speed 26b during an inertia hold mode. Due to the linear increase, inertia waste is considerably reduced. The SRC logic for controlling the inertia may have a sample time (e.g., 8 milliseconds). A delta engine or input shaft speed may be determined as a change amount or increment of the input shaft speed per sample time. The delta input shaft speed or input shaft speed increment is not shown in FIG. 2 because the delta input shaft speed or input shaft speed increment corresponds to a small change within a very small interval of time. However, the cumulative effect of controlling the inertia controlled input shaft speed 26b is shown in FIG. 2.

By utilizing the delta engine or input shaft speed, the SRC logic controls the inertia until the engine or input shaft speed reaches or nears a target input shaft speed 22 as shown, for example, in FIG. 2. The delta engine or input shaft speed may be calibrated to determine an engine speed rise rate for improving direct drivability feeling and avoiding an inefficient and abrupt rise in the engine speed. For example, the SRC system and/or method may be calibrated such that the delta engine or input shaft speed delta input speed is, amounting to an engine speed/input shaft speed change rate of 125 RPM (revolutions-per-minute) for every second, at a sample rate of 8 milliseconds.

In one embodiment, the rate of increase of the inertia controlled input shaft speed 26b may be slower than the rate of increase of the initial downshift input shaft speed 26a because the rate of increase or shift speed for the initial downshift may be set by the base/previous control logic that may change the rate of increase or shift speed within a margin of the hardware capacity.

In one embodiment, the throttle opening 28 and the fuel delivery are adjusted in order to maintain the drive force output and acceleration, as shown in FIG. 2. FIG. 2 also shows what the original throttle position 30 would have been without the throttle compensation of the invention. In one embodiment, the ECU 10 utilizes a drive-force control logic. For example, the ECU 10 may determine the needed throttle compensation based on an operation of the SRC. For throttle compensation using a control logic that is separate from the SRC logic, the ECU 10 may set a gain factor to control the allowed amount of throttle compensation. Because at a given point in time, the discrepancy between the controlled and original input shaft speed may rise, the mechanical torque ratio is decreased at such a point in time, and the throttle unit 3 increases a throttle valve opening for providing additional transmission input torque.

In one embodiment, for throttle compensation, a target throttle or air mass flow may be set based on the current conditions. In another embodiment, a control logic operating parallel to the SRC logic calculates and operates the required throttle position to achieve a drive force target based on the acceleration input value and vehicle speed.

In one embodiment, a specific throttle compensation amount is set, for example, based on the difference between the original target engine or input shaft speed and the controlled engine or input shaft target speed. For example, if the original target transmission ratio is 1.0, and the control target transmission ratio is 0.8, the ECU 10 may determine the required throttle compensation based on a map or calculate the required throttle compensation to achieve the original drive force. In one embodiment, a separate control logic may be utilized to set a target drive force based on the vehicle speed and the accelerator pedal position to achieve the target drive force. The drive force logic may control the throttle to achieve the target drive force for compensation.

Figure 3:
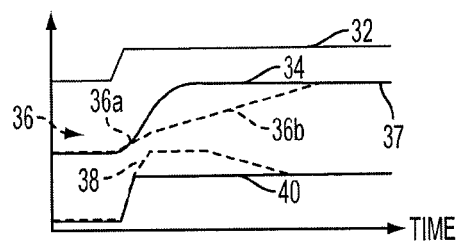
FIG. 3 shows an operation under the shift restraint control system and/or method when the acceleration input sensor detects a "roll-on" or moderate application speed according to an embodiment of the present invention.

FIG. 3 shows an operation under the shift restraint control logic when the acceleration input sensor 9 detects the pedal acceleration input value 32 corresponding to a "roll-on" or moderate application speed. After an initial downshift 36a, the inertia is controlled during the rise in engine speed or input shaft speed 36 (shown as the inertia controlled input shaft speed 36b) until a target engine or input shaft speed 37 is reached. FIG. 3 also shows what the rise in the original engine or input shaft speed 34 would have been without the inertia control of the present invention, and what the original throttle position 40 would have been without the throttle compensation. The fuel consumed by the higher airflow of throttle compensation may be about the same as the fuel saved by using lower inertia. The control logic also improves driver controllability such that it is less likely that the engine speed or the input shaft speed will overshoot the driver intended target.

In one embodiment, the ECU 10 may utilize a throttle compensation control logic to set the controlled throttle position 38 and calibrate the level of compensation required for a particular condition. As a result, the fuel economy can be balanced through calibration of the shift amounts, shift rates, and throttle compensation amount. The SRC system and method may calibrate the level of throttle compensation required for a particular detected condition and balance fuel economy through calibration of the shift amounts, shift rates, and throttle compensation amount. The SRC system and method further improves driver controllability by reducing the likelihood that the input shaft speed or the engine output speed overshoots the driver-intended target.

Figure 4:
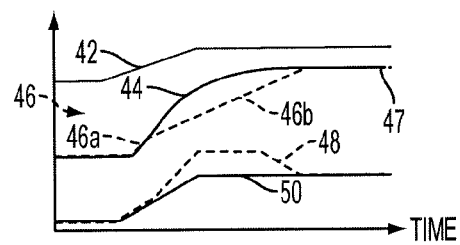
FIG. 4 shows an operation under the shift restraint control system/method during a roll-on acceleration when the acceleration input value is slowly and steadily increased according to an embodiment of the present invention.

FIG. 4 shows an operation under the shift restraint control system and/or method during a roll-on acceleration when the acceleration input value 42 is slowly and steadily increased. The gap between the original engine or input shaft speed 44 and the controlled engine or input shaft speed 46 under the roll-on acceleration (as shown in FIG. 4) is smaller than the gap between the original engine or input shaft speed 34 and the controlled engine or input shaft speed 36 during the small acceleration input increase (as shown in FIG. 3) in part because a roll-on operation of the accelerator pedal inherently reduces the shift speed. As shown by the controlled engine or input shaft speed 46, after the initial downshift 46a, inertia is controlled until the engine or input shaft speed 46 reaches the target engine or input shaft speed 47 (as shown by 46b). The controlled throttle opening 48 is shown with respect to the original throttle position 50, the gap between 48 and 50 representing the throttle compensation for maintaining the drive force as discussed above with respect to FIGS. 2 and 3.

Figure 5:
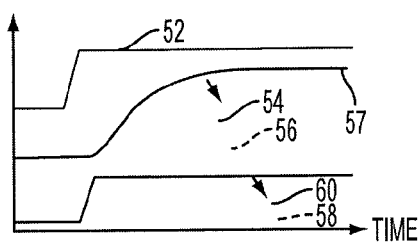
FIG. 5 shows an operation under the shift restraint control system/method when the driver provides an acceleration input corresponding to a high or maximum power output or acceleration request according to an embodiment of the present invention.

FIG. 5 shows an operation under the shift restraint control system and method when the driver provides an acceleration input corresponding to a high or maximum power output or acceleration request according to an embodiment of the present invention. For example, a relatively high and abrupt increase of the pedal acceleration input value 52 may indicate that the driver intends a high or maximum power output or acceleration to be applied. In one embodiment, when the abrupt increase exceeds an operating range of the control logic described herein, the SRC logic is not activated. For example, as shown in FIG. 5, the original engine or input shaft speed 54 may match or closely correspond to the controlled engine or input shaft speed 56 such that they lie substantially on the same graph. Accordingly, the controlled throttle opening position 58 would closely match the original throttle opening position 60 because the gap shown, for example, in FIGS. 2, 3 and 4 between the controlled and original input shaft speed is non-existent or minimal herein. As such, the method and system provides a high or maximum power output when the method and system detects that the driver intends to apply maximum power output or acceleration. For example, the method and system may detect such an intention when an abrupt and high pedal acceleration increase is detected, for example, as shown in FIG. 5.

For example, a separate control logic may operate for acceleration input pedal above 40% application (or above 35% to 45% application). This threshold number or range may be predetermined or may be based on various conditions and set in real time. The 40% application threshold is merely an example of the threshold; other application percentages or rates of change of the application percentages may be utilized. In one embodiment, even when the separate control logic is implemented, the SRC logic may set the initial conditions (e.g., the initial downshift or an initial inertia control). In one embodiment, in response to the high and abrupt increase of the acceleration input value 52, the fastest possible shift is executed. But regardless of other operating logic, the SRC system and method may set certain start conditions such as a pedal or speed operating range.

Figure 6:
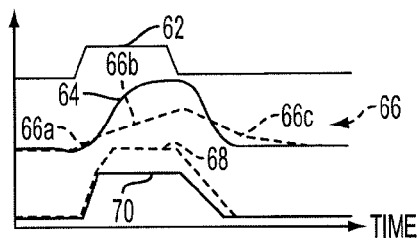
FIG. 6 shows an operation under the shift restraint control logic during a return function when the acceleration input value increases and subsequently decreases according to an embodiment of the present invention.

FIG. 6 shows an operation under the shift restraint control logic during a return function when the pedal acceleration input value 62 increases and subsequently decreases.

Most commonly, the shift will be completed and the actual engine or input shaft speed will reach the same original actual engine or input shaft speed, that is, the target speed (for example, target engine or input shaft speed 37, 47, or 57 in FIG. 3, 4, or 5, respectively). In the return function shown in FIG. 6, however, it cannot be assumed that the driver will return the acceleration pedal to its original position, so a timer is used to complete the SRC process. In one embodiment, the timer is used when the engine or input shaft speed reaches the static engine or input shaft speed target, which may be the same as the static engine or input shaft speed target of the original control. If however, the final shift is not reached, the inertia or the transmission ratio is still controlled and maintained to mitigate a reverse flare (rapid upshift causing the engine speed to drop).

When the input shaft speed or the engine output speed reaches the initial shift point, a secondary rate of change of the engine or input shaft speed 66 is defined. The absolute value of the rate of decline may be the same, or smaller than the rate of increase of the inertia hold phase 66. It is also possible for the absolute value of the rate of decline to be greater than the rate of increase of the inertia hold phase 66. Depending on detected parameters (for example, the initial shift point and target input shaft or engine output speed) and design concerns (the resulting flare or reverse flare), it may or may not be desirable for the rate of decline to be greater than the rate of increase of the inertia hold phase 66. The return function minimizes the rapid engine speed movement, thereby reducing inertia loss and improving the linear drivability feeling.

As shown in FIG. 6, in one embodiment, the initial downshift 66a is followed by an inertia hold 66b to control the rise in the input shaft speed or engine output speed. If the acceleration input value 62 drops before the input shaft speed or engine output speed reaches the target amount, the input shaft speed increase process is cancelled, and return function activates. The rate of change of the return input shaft speed 66c is controlled to avoid a reverse flare and to reduce inertia waste. The gap between the controlled engine or input shaft speed 66 and the original engine or input shaft speed 64 corresponds to the inertia waste that is avoided or eliminated in the controlled logic described herein. In one embodiment, if the actual engine or input shaft speed 66 meets a target engine or input shaft speed, the SRC logic is cancelled or deactivated after a certain period of time passes. For example, a timer may be set when the actual engine or input shaft speed 66 meets or nears a target engine or input shaft speed. The throttle compensation corresponds to the difference between the controlled throttle opening 68 and the original throttle opening 70. The avoided inertia waste compensates for the reduced fuel efficiency as a result of the controlled throttle opening 68 such that the overall fuel efficiency is not reduced.

Figure 7:
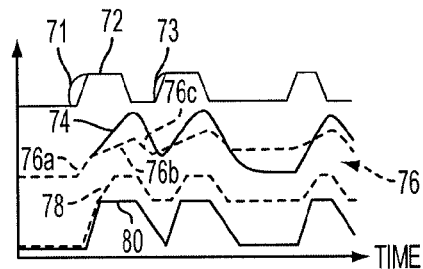
FIG. 7 shows an operation under the shift restraint control logic during a condition in which the acceleration input value repeatedly increases and decreases according to an embodiment of the present invention.

FIG. 7 shows an operation under the shift restraint control logic during a condition in which the pedal acceleration input value 72 repeatedly increases (as denoted by rise portions 71 and 73) and decreases according to an embodiment of the present invention. Under the original control operations, the original engine or input shaft speed 74 rises to a high level before abruptly decreasing, resulting in considerable inertia waste and inefficiency. Under the SRC system and method, the controlled engine or input shaft speed 76 undergoes smaller and/or linear inertia changes due to the inertia control logic. The gap between the original engine or input shaft speed 74 and the controlled engine or input shaft speed 76 corresponds to the avoided inertia waste.

In one embodiment, the initial downshift 76a, the inertia controlled input shaft speed 76b, and the return input shaft speed 76c are controlled similarly to 66a, 66b, and 66c discussed above with respect to FIG. 6, respectively. In one embodiment, a timer is started when or after the engine or input speed nears the target speed. The target may change based on the acceleration input value 72, and as such, the ECU 10 may continuously reset the timer in this condition. If the pedal acceleration input 72 increases while the engine or input shaft speed 74 is decreasing, the timer may be reset and inertia is controlled again. Depending on the engine or input shaft speed 74, a downshift may once again be executed.

In one embodiment, a downshift can be controlled to be executed only at the start of the logic or from the return phase (initiated once the engine or input shaft speed drops below the initial shift speed). As such, as long as the revolution speed remains above the initial shift speed, the rate will be defined by the inertia hold mode. It is possible for the acceleration input value to repeatedly increase and decrease (for example, as shown in FIG. 7) during the return phase causing another downshift, but the SRC logic sets a maximum downshift so that no quick shifts will be executed, and the speed increases or decreases by defined rates. For example, the defined rates may correspond to data in look-up tables stored in the memory 11.

The SRC logic described above with respect to FIGS. 2-7 provide significant improvements in energy efficiency and drivability. Because sheaves of a continuously variable transmission are relatively heavy, reduction in inertia loss can lead to significant improvements in efficiency. Furthermore, the inertia controls and the maximum guard on the initial downshift leads to improvements in drivability and acceleration (direct) feeling. For example, the SRC logic reduces the flare feeling/reverse flare feeling as discussed above with respect to FIGS. 2-7.

In one embodiment, the inertia for slow acceleration inputs may be controlled to change slowly, whereas when the acceleration input rises rapidly, the inertia may not be controlled or may be set to change at a high rate. In one embodiment, the inertia amount may be changed instead of setting an inertia target for improving drivability feeling.

In one embodiment, the shift speed during the cancellation stage of the return phase may be controlled. For example, the ECU 10 may control a stepped cancellation when the acceleration input abruptly decreases. The ECU 10 may control a slow cancellation for a roll-off condition (which would be the reverse of a roll-on condition shown in FIG. 4). The cancellation may further depend on vehicle type.

Figure 8:
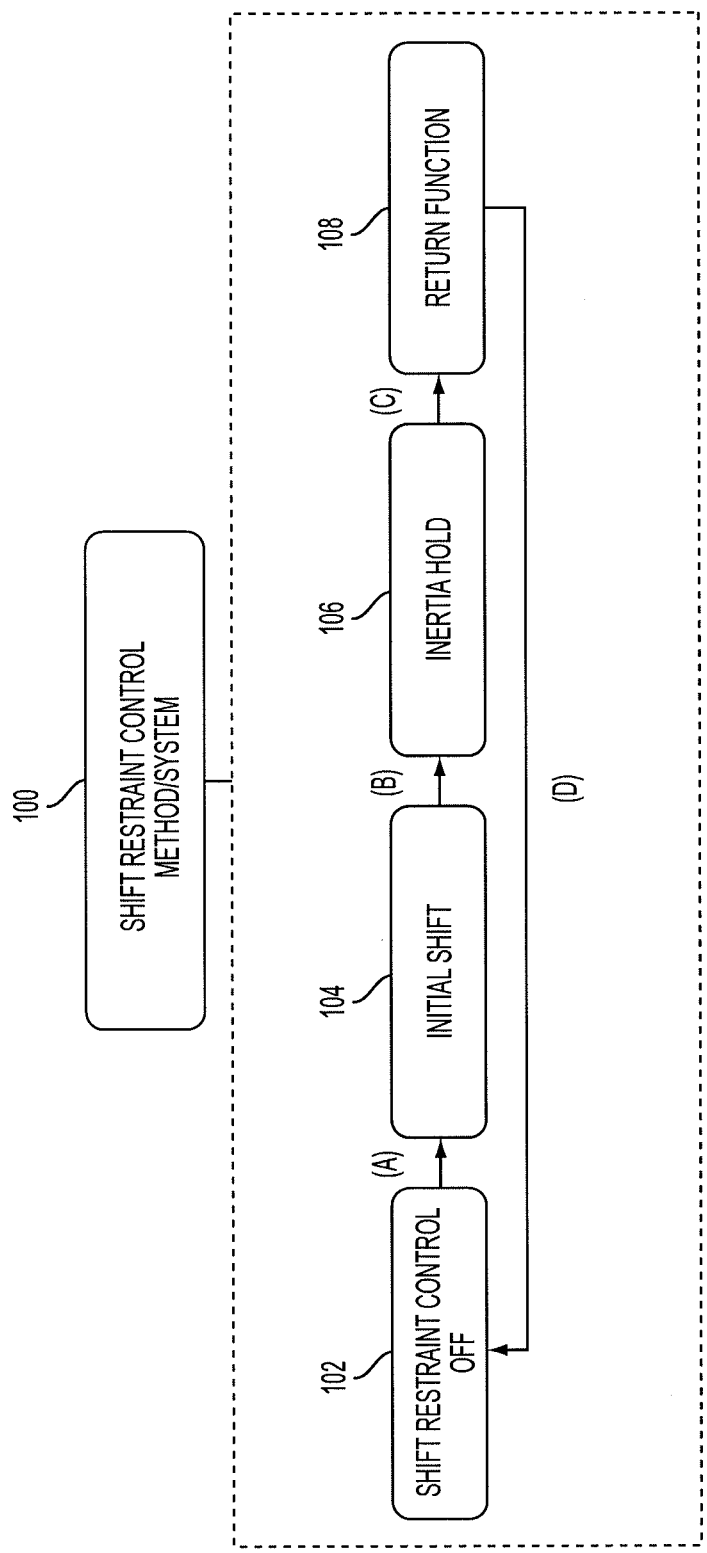
FIG. 8 shows a relationship between a plurality of modes of the shift restraint control system and/or method according to an embodiment of the present invention.

FIG. 8 shows a relationship between a plurality of modes of the shift restraint control (SRC) system and method 100 according to an embodiment of the present invention. Initially, the shift restraint control is not activated as shown in the shift-restraint-off mode 102. In the initial shift mode 104, the initial downshift may be controlled, for example, as described with respect to FIGS. 2-7. In the inertia hold mode or phase 106, the inertia is controlled, for example, as described with respect to FIGS. 2-7. The return function mode 108 was discussed above with respect to FIGS. 6 and 7. In one embodiment, the priority between logic flows is as follows: (A), (B), (C), and then (D). The process may then be repeated. The logic flow may be in a different order in other embodiments. The logic flow may also omit one or more of these steps in other embodiments. In one embodiment, a separate logical flow order may be followed depending on the acceleration input value and other detected conditions.

Figure 9:
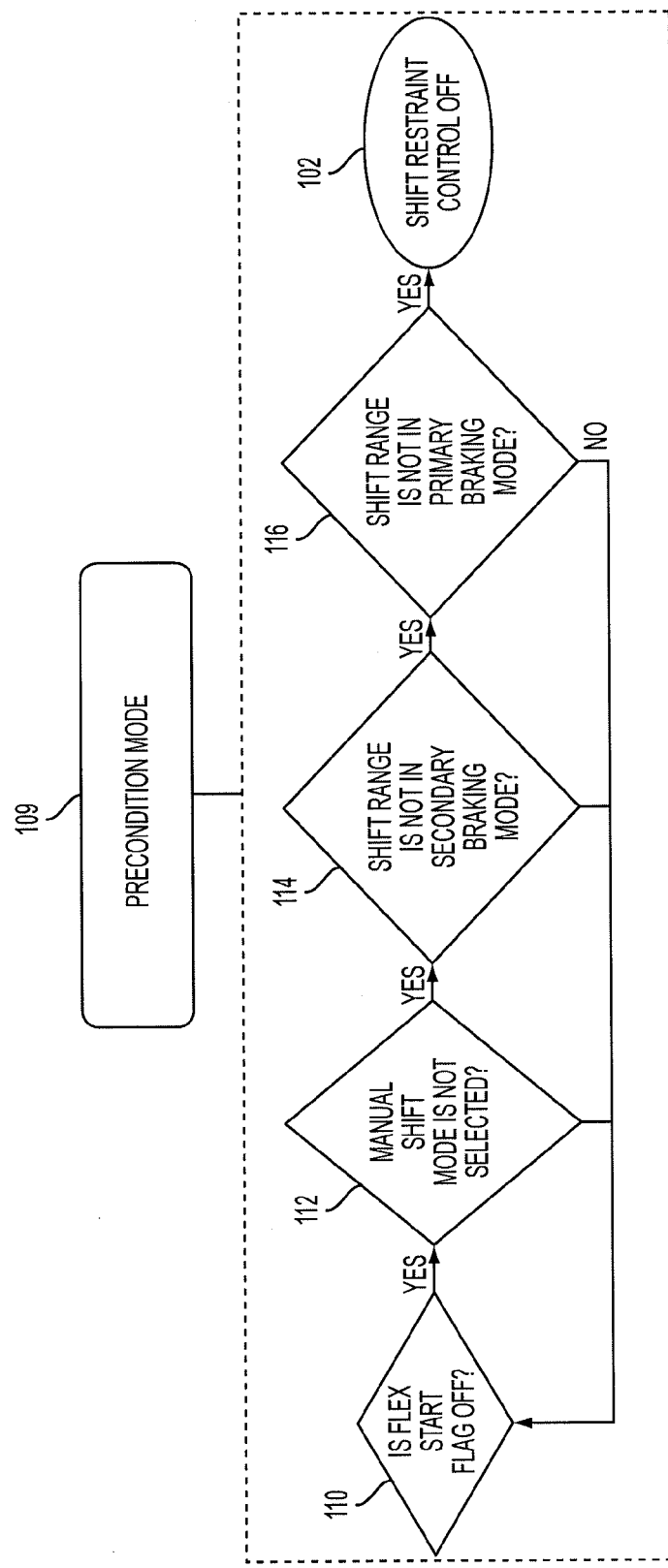
FIG. 9 shows a flowchart of an operation under the shift restraint control system and/or method during which a plurality of preconditions are determined and checked according to an embodiment of the present invention.

FIG. 9 shows a flowchart of an operation under the shift restraint control system/method during which a plurality of preconditions are determined and checked, according to an embodiment of the present invention. In an embodiment, the preconditions are checked because if such conditions are not met, a separate control logic may be better suited for controlling the engine speed or input shaft speed.

In step 110, the ECU checks whether the flex start flag is off which indicates that the torque converter lock up clutch is not slipping such that the engine speed and transmission input speed will be the same. In one embodiment, a control logic other than the SRC logic may be operated when there is slippage such that a similar character as described above with respect to the SRC logic is achieved. For example, such a control logic may control drivability and efficiency of a mechanical connection versus a fluid coupling by controlling the engine characteristics based on the slip amount.

In one embodiment, the SRC logic described herein is implemented only when the torque converter is locked and a modified SRC logic or separate control logic is operated when the torque converter is not locked. Because a goal of the SRC logic is to control engine speed by shifting the transmission ratio, when the torque converter is not locked, the variability from the hydraulic slip would require more complicated calculations and additional sensors. For example, the separate control system/method may be a control system and method for compensating transmission control activated when there is a torque converter slip. In one embodiment, when the torque converter is not in a locked condition, similar effects may be achieved through calibration.

Referring to FIG. 9, in one embodiment, in step 112, the ECU 10 determines whether a manual shift has been requested by either the paddle shifters or manual gate on the shift lever. For example, an alternative control system and method may be better suited for manual shifting than the SRC system and method. In step 114, the ECU 10 determines whether the shift range is in secondary braking mode. In the secondary braking mode, the engine speed will be maintained at a higher speed to provide engine braking. In step 116, the ECU 10 determines whether the shifting range is in a primary brake mode with an even higher engine speed to more aggressively slow the vehicle down. In one embodiment, if these preconditions are met, the process moves to the shift restraint control off mode 102 which is then followed by the initial shift 104, as shown in FIG. 8. One reason for this implementation is that a better suited control logic is already implemented for scenarios in which the preconditions are not met.

Figure 10:
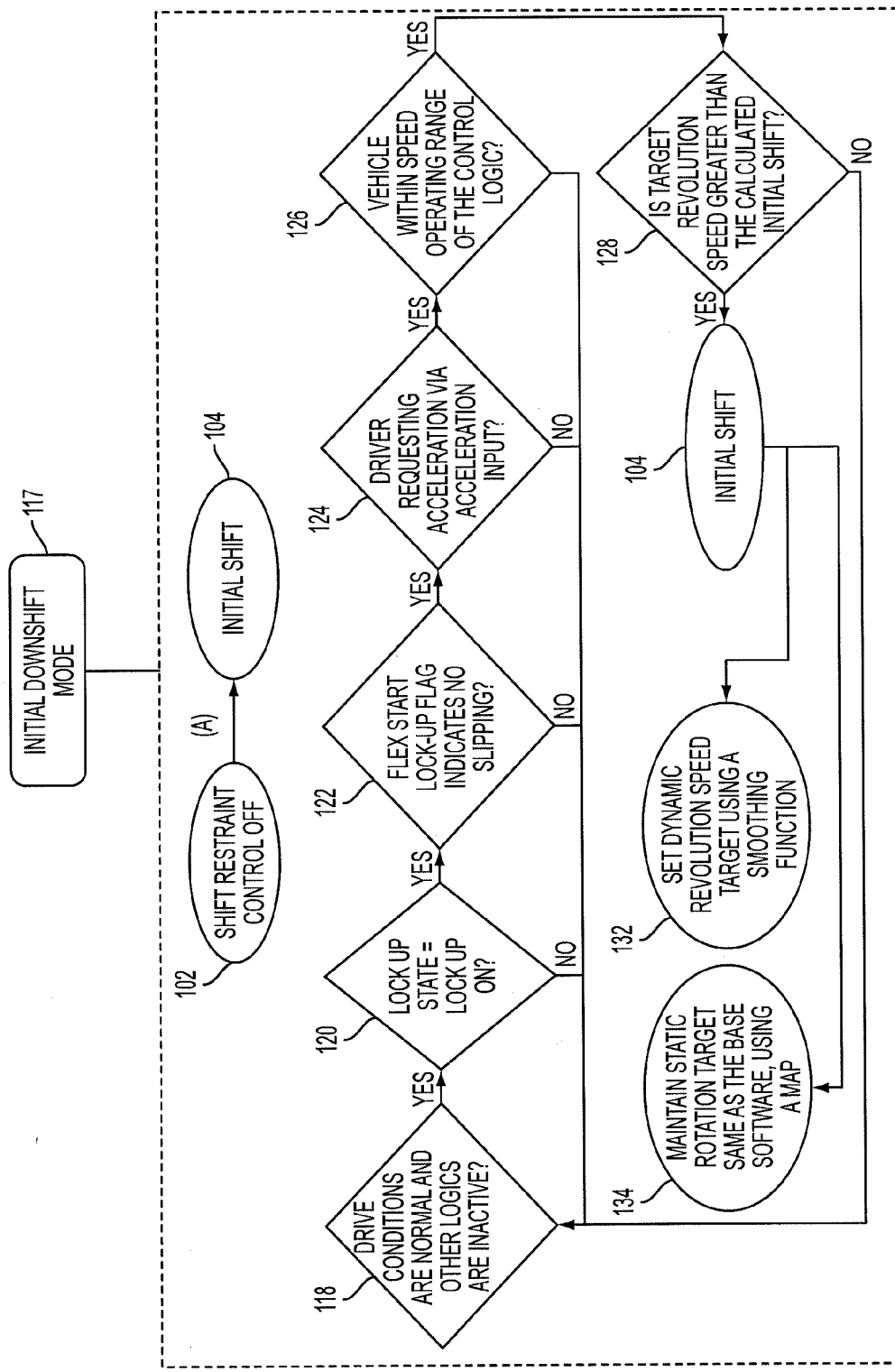
FIG. 10 shows a flowchart of an operation under the shift restraint control system and/or method in an initial downshift mode according to an embodiment of the present invention.

FIG. 10 shows a flowchart of an operation under the shift restraint control system and method in an initial downshift mode 117 according to an embodiment of the present invention. More particularly, the steps described with respect to FIG. 10 correspond to (A) in FIG. 8. The SRC system and method may be initially off as shown in step 102, and the initial shift 104 is completed, as discussed below with respect to steps 118-134. In one embodiment, the downshift is executed upon completion of the initial downshift mode 117. When preconditions are met, the initial downshift mode 117 is allowed to check for the various conditions and calculate the initial shift amount.

In step 118, the ECU 10 checks whether the drive conditions are normal and that no other control system and method is active. For example, the ECU 10 may ensure that a grade control system and method or a stability control system and method is not active because the SRC system and method may interfere with their respective operations.

In step 120, the ECU 10 may ensure that the torque converter is in a lock-up state. In step 122, the ECU 10 may determine whether there is any slipping during the flex lock up for the reasons set forth above with respect to step 110 of FIG. 9. In step 124, the ECU 10 determines whether the driver is indeed requesting acceleration via the accelerator pedal. For example, the ECU 10 may determine the throttle opening angle, set by a relationship with the accelerator pedal. For example, the ECU 10 may determine whether the throttle opening angle exceeds a value in a look-up table based on current conditions. The look-up table may contain throttle openings calibrated to ensure acceleration for various conditions. The ECU 10 may set the acceleration condition flag to an ON state when the throttle opening angle exceeds the throttle opening calibrated to ensure acceleration.

In step 126, the ECU 10 determines whether the engine speed, input shaft speed or the vehicle speed is within a speed operation range of the proposed system and method. For example, the operating range for the SRC system and method may be between 2 and 180 miles per hour. Other operating ranges in other measures of speed (e.g., kilometers per hour) or other parameters may be utilized without limiting the scope of the present invention.

In step 128, the ECU 10 determines whether the target engine or input shaft speed is greater than the calculated initial shift target. In one embodiment, the initial shift target may be the minimum of either an offset amount from the current actual engine/input shaft speed and a value looked up from a speed table for current vehicle conditions such as the output speed of the transmission. If the target revolution speed is greater than the calculated initial shift, the shift is executed in step 104. The static engine or input shaft speed target is the end speed that depends on the acceleration input value, and the SRC system and method sets the character to reach that target speed, first with a maximum guard value set for an initial shift and then a defined rise rate to control the inertia, as set forth above with respect to FIGS. 2-7. In one embodiment, if the static engine or input shaft speed target is not higher than the initial shift, then the SRC system and method is not operated, and the (small) shift will be completed via the base software.

FIG. 11 shows a look-up table 148 stored in the memory 11 and corresponding to maximum guard values for the initial shift of the shift restraint control system and method according to an embodiment of the present invention. In one embodiment, the maximum guard value may be, for example, the maximum guard value 23 discussed above with respect to FIG. 2. In one embodiment, the table values 150 may correspond to maximum downshift amounts 150 for limiting repeated shifts by an operation such as the condition discussed above with respect to FIG. 7. If the engine speed becomes relatively high, an initial shift will not be necessary to generate drive force and inertia hold phase is initiated immediately. The table 148 indicates a maximum downshift amount 150 for a given x row value of vehicle speed or output speed of the transmission 149 and a given y column value of acceleration pedal position 148. While the table 148 has the same maximum downshift to 2500 RPM, the table 148 is designed so that a maximum downshift can be considered for various vehicle speeds and pedal inputs. A high downshift speed may be acceptable at high vehicle speed and pedal application. The maximum downshift of 2500 is provided merely as an example for illustration purposes. The value may be calibrated for a particular vehicle or powertrain without limiting the scope of the present invention. In general, the downshift values 150 may vary based on design needs.

Referring back to FIG. 10, in step 132, the SRC system and method sets the dynamic engine or input shaft revolution speed target using a smoothing function defined in the base software. This smoothing function ensures that there are no abrupt changes in the shift operation using smoothening parameters. In step 134, the SRC maintains the static engine or input shaft rotation speed target to be the same as the base software, using a map.

Figure 12:
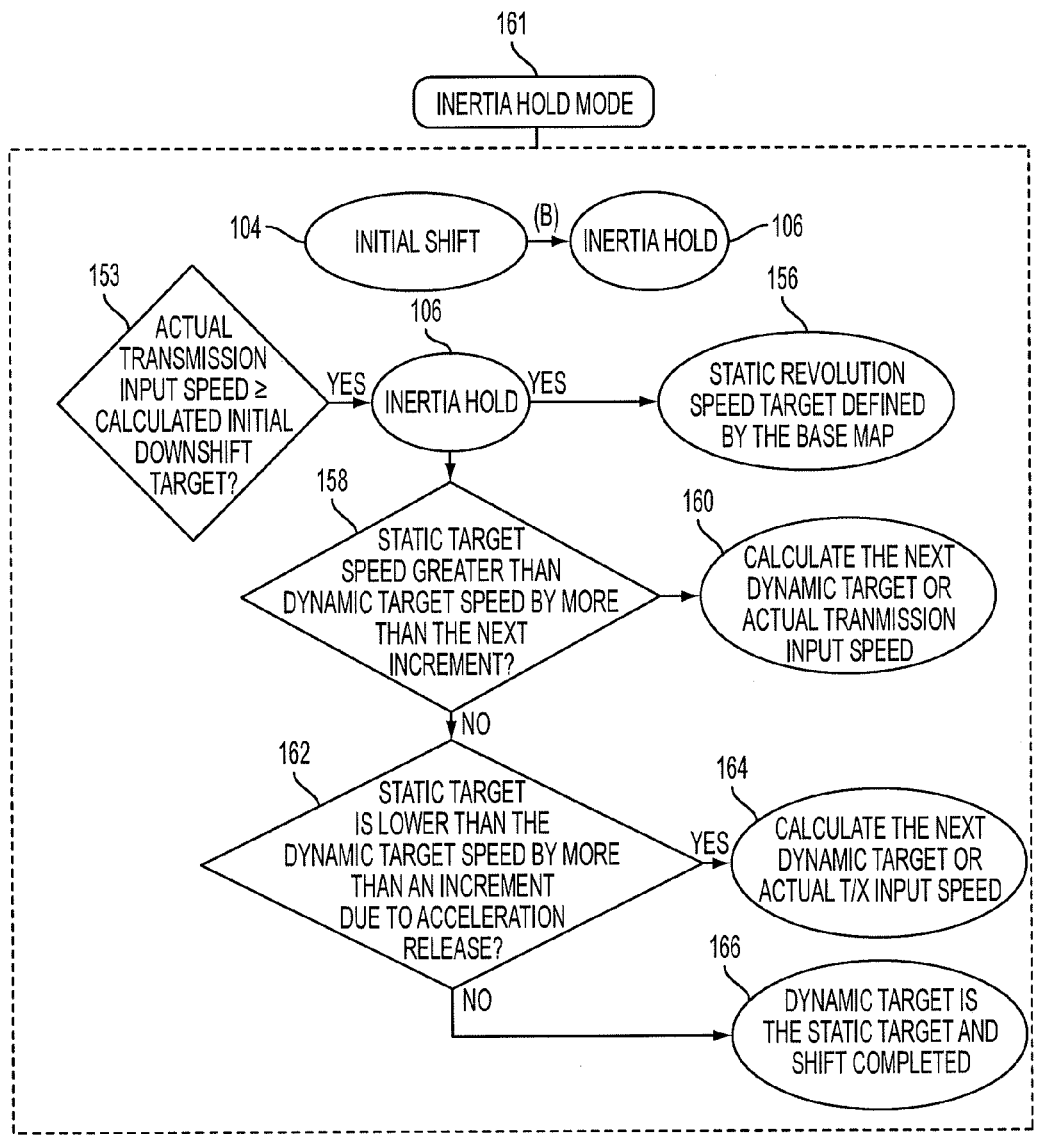
FIG. 12 shows a flowchart of an operation under the shift restraint control system and/or method in an inertia hold mode according to an embodiment of the present invention.

FIG. 12 shows a flowchart of an operation under the shift restraint control system and method in an inertia hold mode 161 according to an embodiment of the present invention. More particularly, the steps described with respect to FIG. 12 correspond to (B) in FIG. 8, transitioning from the initial shift 104 to the inertia hold 106.

In step 153, the SRC system and method determines whether the actual engine or transmission input speed is greater than or equal to the calculated initial downshift target. For example, in step 153, the SRC system and method may compare the actual engine or transmission input speed to the maximum guard value similarly to the process discussed above with respect to FIGS. 2 and 3. Step 153 is distinguishable from step 128 discussed above with respect to FIG. 10 during which the target revolution speed was compared to the calculated initial downshift. The static target speed is instantly set by the acceleration input (e.g., pedal position) and in step 128, the ECU 10 determines whether a shift is required or not. However, the actual input shaft speed will still be at its original position at this point. The initial shift will execute and actual input shaft speed will rise up to that initial shift point. Once the rotation speed reaches that initial shift, inertia hold phase starts, and input shaft speed will continue to shift to the target speed but at the rate defined by the SRC system and method.

Once the engine or input shaft rotation speed reaches the initial shift, inertia hold phase starts, and the input shaft or engine speed will continue to shift to the static engine or transmission input target speed but at the defined rate to control inertia as indicated by the inertia hold mode 106.

In step 156, the SRC system and method sets the static engine or input shaft revolution speed target to be the same as a value defined by a base map. In step 158, as long as the static engine or transmission input target speed is higher than the dynamic engine or transmission input target speed (that may be, for example, the current actual engine or transmission input speed) by a value greater than the next value (for example, +100 RPM), the next dynamic target or actual transmission input speed value is calculated.

For example, the foregoing calculation may be based on the look-up table 152 shown in FIG. 13. FIG. 13 shows a look-up table stored in the memory and corresponding to a rate of increase of the input shaft speed or engine output speed under the shift restraint control system and method according to an embodiment of the present invention. For example, the rotation speed increase values per second 155 may be determined based on a given x value of acceleration pedal position 151 and a given y value of vehicle speed or transmission output speed 154. The rotation speed increase values per second values 155 may be determined based on design needs, given that the desired rate of increase may differ depending on various current conditions.

Likewise, if the static target is lower because the driver released the accelerator pedal (for example, −100 RPM), then the next dynamic target or actual input speed value will be calculated. If however, the difference between the static target speed and actual input shaft speed is smaller than the next increment, the dynamic target simply becomes the static target and the shift is completed. In one embodiment, the increase and decrease rates may be the same or set differently based on design needs.

FIG. 14 shows a look-up table stored in the memory and corresponding to a rate of decrease of the input shaft speed or engine output speed under the shift restraint control system and method according to an embodiment of the present invention. In other words, the look-up table 170 is similar to table 152 shown in FIG. 13 but instead of the increase values per second 152, table 170 shows an example of decrease values per second. For example, the rotation speed decrease values per second 171 may be determined based on a given x value of acceleration pedal position 168 and a given y value of vehicle speed or transmission output speed 169.

Figure 15:
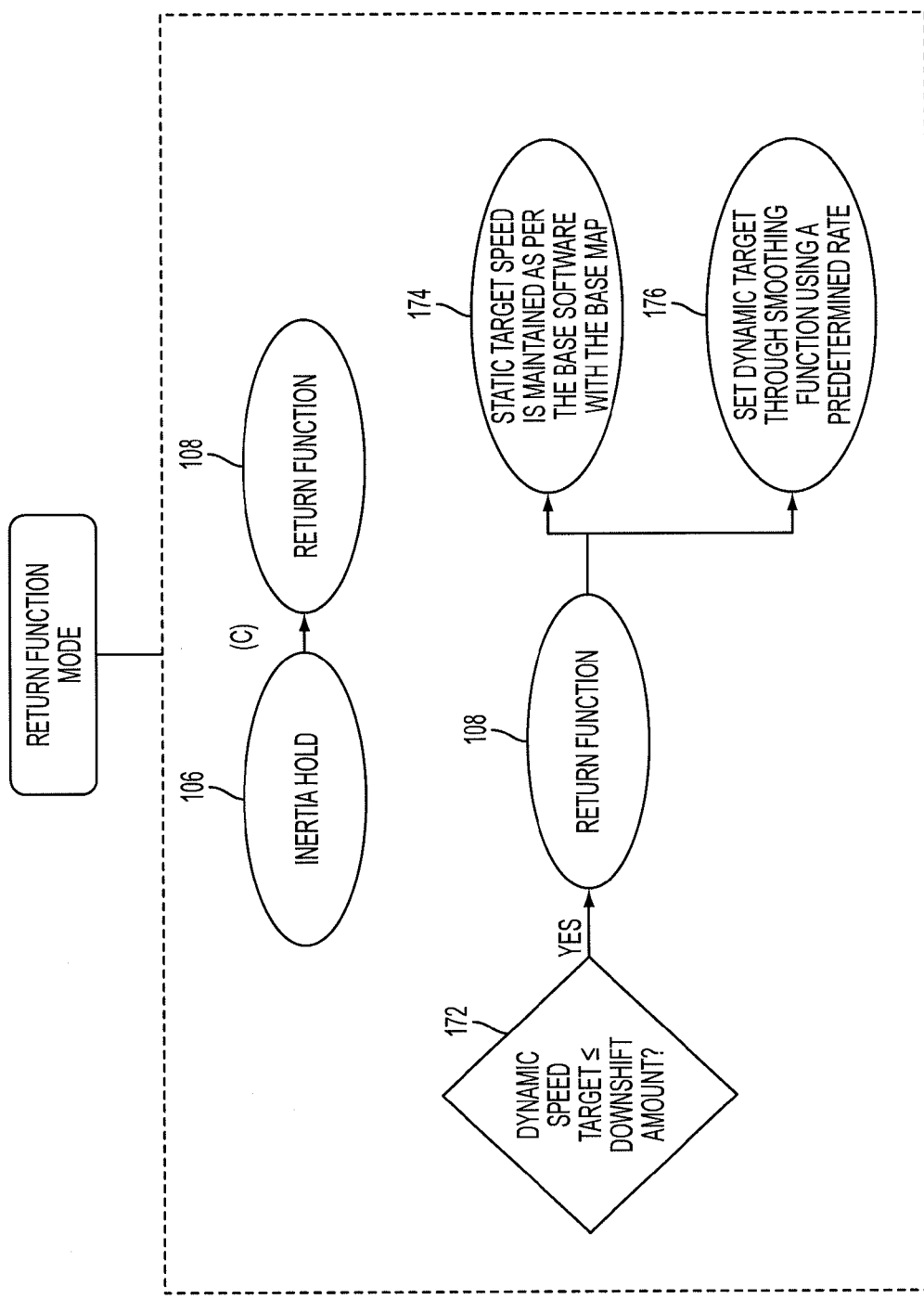
FIG. 15 shows a flowchart of an operation under the shift restraint control system and/or method in a return function mode according to an embodiment of the present invention.

FIG. 15 shows a flowchart of an operation under the shift restraint control system and method in a return function mode according to an embodiment of the present invention. More particularly, the steps described with respect to FIG. 15 correspond to (C) in FIG. 8, transitioning from the inertia hold phase 106 to the return function phase 108.

In step 172, if the dynamic speed target (which may correspond to the actual input shaft speed) decreases to the initial downshift point, the return function phase 108 is initiated. As a result, in step 174, static target speed is maintained. The static target speed may be maintained as defined by the base software with the base map. In step 176, the ECU 10 sets the dynamic target through a smoothing function but with a defined rate. The defined rate may be obtained from a look-up map 180 as shown in FIG. 16.

FIG. 16 shows a look-up map table that refers to engine speed reduction rates 179 during the return phase for a given x row value of acceleration pedal position 177 and a given y column value of vehicle speed or output speed of the transmission 178.

Figure 17:
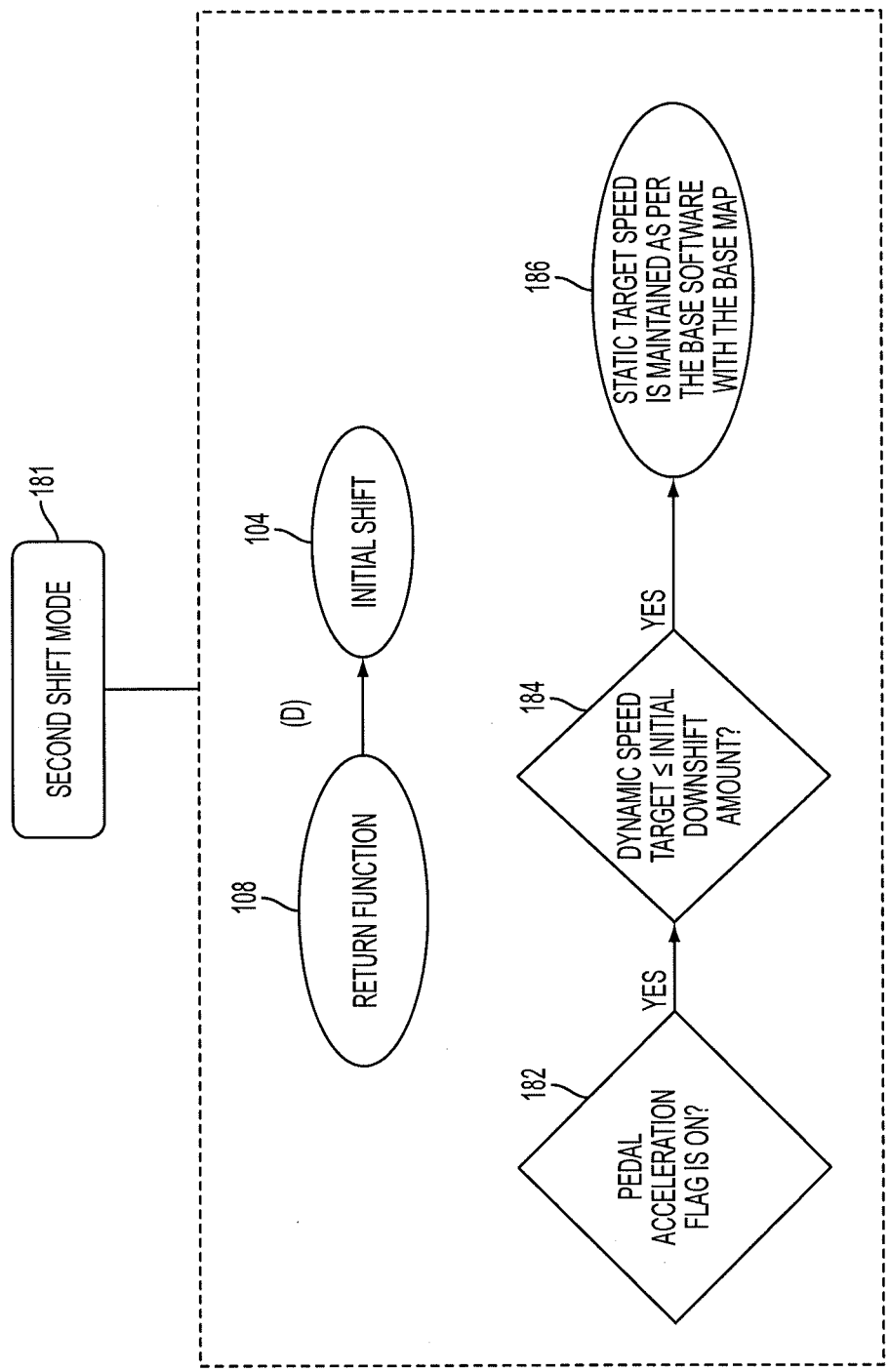
FIG. 17 shows a shift restraint control method operating in a second shift mode according to an embodiment of the present invention.

FIG. 17 shows a shift restraint control method operating in a second shift mode 181 according to an embodiment of the present invention. More particularly, the steps described with respect to FIG. 17 correspond to (D) in FIG. 8, transitioning from the return function state 108 to the initial shift state 104.

In step 182, the pedal acceleration flag is checked as described above with respect to step 124 of FIG. 10 during the initial downshift. In step 184, the ECU 10 determines whether the static input shaft speed is greater than the calculated initial downshift target (as described above with respect to step 128 of FIG. 10) before a downshift is repeated. These conditions are the same as the initial shift conditions of FIG. 10; however, these conditions exist within the return phase, thereby allowing the initial shift to be executed if necessary without completely returning to the precondition phase first.

Therefore, as shown in FIGS. 2-7 and as discussed with respect to the process of FIGS. 8-10, 12, 15 and 17, the ECU 10 may reduce engine noise and non-linear acceleration feeling by controlling the change rate in engine speed or transmission input speed during an initial shift, an inertia hold, a return function, and/or a second shift. Drive force is maintained with an initial downshift operation and throttle compensation. Fuel economy may be minimally affected due to the reduction in inertia loss. In one embodiment, the method may be activated when certain preconditions are met, and the control logic of the system and method may control the transmission input speed, the engine output speed, and/or transmission ratio based on an acceleration input until logic completion conditions are met. In one embodiment, the system/method sets a static target input shaft speed or engine output speed and controls the dynamic character (e.g., the rate of speed change) to reach the static target, first with a relatively quick ratio change/shift and then by a defined rate of increase or decrease. As a result, the shift restraint control system/method reduces inertia waste and the non-linear and flare-feeling for the driver, yet maintains or improves fuel economy.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A shift restraint control system of an automobile, comprising:
   an acceleration input sensor for detecting an acceleration input;
   an engine having an engine output speed;
   a torque converter connected to the engine;
   a transmission connected to the torque converter and having a transmission input speed;
   a memory for storing shift control data; and
   a control unit connected to at least the acceleration input sensor, the engine, the transmission, and the memory, the control unit configured to:
      control a first rate of increase of the transmission input speed or of the engine output speed to cause a first linear increase of the transmission input speed or of the engine output speed to an initial shift speed based on an increase of the acceleration input detected by the acceleration input sensor,
      control a second rate of increase of the transmission input speed or of the engine output speed to cause a second linear increase of the transmission input speed or of the engine output speed based on the shift control data and in response to the transmission input speed or of the engine output speed being equal to or greater than the initial shift speed, the second rate of increase being less than the first rate of increase, and
      control a rate of decrease of the transmission input speed or of the engine output speed based on the shift control data and in response to a decrease of the acceleration input detected by the acceleration input sensor.

2. The shift restraint control system of claim 1, wherein the control unit is further configured to:
   determine a target transmission input speed or a target engine output speed, and
   control the second rate of increase of the transmission input speed or of the engine output speed to cause the second linear increase of the transmission input speed or of the engine output speed to the target transmission input speed or the target engine output speed.

3. The shift restraint control system of claim 2, wherein the control unit is further configured to:
   initiate or set a timer when or after the transmission input speed or the engine output speed is equal to or within a threshold deviation from the target transmission input speed or the target engine output speed, and
   deactivate control of the transmission input speed or of the engine output speed when the timer expires.

4. The shift restraint control system of claim 1, further comprising a throttle unit connected to the engine and the control unit,
   wherein the throttle unit includes a throttle valve opening, and the throttle unit is configured to increase the throttle valve opening of the throttle unit to compensate for the control of the second rate of increase of the transmission input speed or of the engine output speed.

5. The shift restraint control system of claim 1, wherein the initial shift speed is set by the control unit to control a predetermined maximum amount of increase of the transmission input speed or of the engine output speed.

6. The shift restraint control system of claim 1, wherein the control unit is configured to control the first rate of increase of the transmission input speed or of the engine speed when or after determining that the torque converter is in a locked state.

7. The shift restraint control system of claim 1, wherein the control unit is configured to:
determine a speed increment, and
control the second rate of increase of the transmission input speed or of the engine output speed by consecutively increasing the transmission input speed or the engine output speed by the speed increment for each of a plurality of consecutive sampling time periods.

8. The shift restraint control system of claim 1, wherein the control unit is configured to:
determine a target speed value for the transmission input speed or the engine output speed based on the acceleration input, and
control the second rate of increase of the transmission input speed or of the engine output speed until the transmission input speed or the engine output speed reaches the target speed value or until a cancel condition is met, for reducing inertia waste.

9. The shift restraint control system of claim 8, wherein the control unit is further configured to control the rate of decrease of the transmission input speed or of the engine output speed to reduce or prevent an abrupt decrease of the engine output speed.

10. A shift restraint control system of an automobile, comprising:
an acceleration input sensor for detecting an acceleration input;
an engine having an engine output speed;
a torque converter connected to the engine;
a transmission connected to the torque converter and having a transmission input speed;
a memory for storing shift control data; and
a control unit connected to the acceleration input sensor, the engine, and the transmission, the control unit being configured to:
determine whether a plurality of preconditions for the automobile are met,
control a first rate of increase of the transmission input speed or of the engine output speed to cause a first linear increase of the transmission input speed or of the engine output speed to an initial shift speed set by the control unit to control a predetermined maximum amount of increase of the transmission input speed or of the engine output speed based on an increase of the acceleration input detected by the acceleration input sensor and the plurality of preconditions for the automobile are met,
control a second rate of increase of the transmission input speed or of the engine output speed to cause a second linear increase of the transmission input speed or of the engine output speed in response to the transmission input speed or the engine output speed being equal to or greater than the initial shift speed, the second rate of increase being different than the first rate of increase, and
control a rate of decrease of the transmission input speed or of the engine output speed based on the shift control data.

11. The shift restraint control system of claim 10, wherein to determine whether the plurality of preconditions are met, the control unit is configured to determine whether the torque converter is in a locked state.

12. The shift restraint control system of claim 10, wherein the control unit is further configured to control the rate of decrease of the transmission input speed or of the engine output speed in response to a decrease of the acceleration input detected by the acceleration input sensor.

13. A method for transmission shift restraint control of an automobile, the method comprising:
providing a torque converter connecting an engine to a transmission, the engine having an engine output speed and the transmission having a transmission input speed;
detecting, using an acceleration input sensor, an acceleration input;
controlling, using a control unit connected to at least the acceleration input sensor, the engine, and the transmission, a first rate of increase of the transmission input speed or of the engine output speed to cause a first linear increase of the transmission input speed or of the engine output speed to an initial shift speed based on an increase of the acceleration input detected by the acceleration input sensor;
controlling, using the control unit, a second rate of increase of the transmission input speed or of the engine output speed to cause a second linear increase of the transmission input speed or of the engine output speed in response to the transmission input speed or of the engine output speed being equal to or greater than the initial shift speed, the second rate of increase being less than the first rate of increase; and
controlling, using the control unit, a decrease of the transmission input speed or of the engine output speed based on the shift control data and in response to a decrease of the acceleration input detected by the acceleration input sensor.

14. The method of claim 13, further comprising:
determining, using the control unit, a target transmission input speed or a target engine output speed; and
controlling, using the control unit, the second rate of increase of the transmission input speed or of the engine output speed until the transmission input speed or the engine output speed is equal to or greater than the target transmission input speed or of the target engine output speed, respectively.

15. The method of claim 13, further comprising:
providing a throttle unit connected to the engine and the control unit, the throttle unit including a throttle valve opening; and
increasing, using the throttle unit, the throttle valve opening to compensate for the control of the second rate of increase of the transmission input speed or of the engine output speed.

16. The method of claim 13,
wherein the initial shift speed is set by the control unit to a predetermined maximum amount of increase of the transmission input speed or of the engine output speed.

* * * * *